United States Patent Office 3,719,622
Patented Mar. 6, 1973

3,719,622
RAPID DRYING ALKYD COATING MODIFIED
WITH AMINO AROMATIC CARBOXYLIC ACID
Robert D. Holzinger, Homewood, Ill., assignor to The
Sherwin-Williams Company, Cleveland, Ohio
No Drawing. Filed June 28, 1971, Ser. No. 157,696
Int. Cl. C08g 17/16; C09d 3/64
U.S. Cl. 260—22 A                                8 Claims

ABSTRACT OF THE DISCLOSURE

Modified short oil and medium oil length alkyd resins with rapid drying characteristics which yield tack-free films within from about 15 minutes to 110 minutes and which employ relatively small amounts, up to 15% by weight of the resin composition, of an amino benzoic acid, e.g. anthranilic acid or compounds which yield anthranilic acid during cooking of the resin, are provided. Methods of producing the aforementioned modified alkyd resins are also provided.

BACKGROUND OF THE INVENTION

Alkyd resins are widely used in the preparation of surface coating compositions. The particularly desired class of so-called "oil-modified" alkyd resins employed in coatings are prepared by the interreaction or intercondensation of one or more polybasic acids, one or more polyols, and an unsaturated fatty acid derived from a glyceride oil. Alkyd resin chemistry is well known to those skilled in the art and, in the interest of brevity, will not be discussed in detail. The preparation and physical properties of alkyd resins are described in numerous texts, such as vol. 1 of "Organic Coating Technology," Henry Fleming Payne, John Wiley & Sons, Inc., New York, 1954.

The polyhydric alcohols used in the preparation of the alkyds of the invention are those which in the pure state contain at least three esterifiable hydroxyl groups. Illustrative examples of such alcohols are glycerol, polyglycerol, pentaerythritol, mannitol, sorbitol, trimethylolpropane, 1,2,6-hexanetriol, dipentaerythritol, polyallyl alcohol, polymethallyl alcohol, polyols formed by the condensation of bis-phenols with epichlorohydrin, and the like. If desired, combinations of glycols, such as ethylene glycol and the aforementioned polyols, may be used. Mixtures of such polyols may be used in which the average hydroxyl content is in the range of from 2.5 to 4.5.

A wide variety of unsaturated fatty acids may be utilized in the preparation of modified alkyd resins, the source of the fatty acid normally being a naturally occurring vegetable or marine oil. Thus, there may be used the polyethylenic acids derived from the drying oils, and their derivatives, such as their esters, amides, and the like. Examples of these acids and derivatives include the acids derived from oils, such as linseed, soya bean, perilla, oiticica, tung, walnut, and dehydrated castor oil, as linoleic, linolenic, 9,12-octadecadienoic, 9,12,15-octadecatrienoic, and elaeosteric acid; the monohydric alcohol esters of the drying oil acids, such as methyl elaeostearate, butyl elaeostearate, ethyl 9,12-octadecadienoate, butyl 9,12,15-octadecatrienoate, and octyl 9,12-octadecadienoate; the glycerides of the fatty acids of the drying oils, such as the monoglycerides of the linseed oil acids, the diglycerides of the soya bean acids, the monoglycerides of the tung oil acids, and the drying oils themselves, such as tung oil, soya bean oil, hempseed, sardine, and the like.

Though various polycarboxylic acids may be used, generally in the preparation of alkyds only those alkyds made with phthalic anhydride or mixed dicarboxylic acid compositions predominating in phthalic anhydride exhibit the surprisingly rapid drying characteristics obtained with the instant fast-dry agents. Unexpectedly, the fast drying rates using anthranilic acid cannot be obtained with either isophthalic acid or terephthalic acid. The reasons for this are unknown at the present time. Minor amounts, i.e. up to 10% by weight of the polybasic acid, of other polycarboxylic acids may be used in conjunction with phthalic anhydride, generally for the purpose of tailoring the end product. Such acids include maleic, fumaric, itaconic, etc.

The instant drying additives are aromatic monocarboxylic primary amino acids or compounds capable of disproportionating to said acids during a "cook." It is most surprising that primary amines which are normally expected to retard oxidation would be found to possess the property of accelerating the tack-free drying time of oil-modified alkyds.

If desired, other modifiers in addition to the aforementioned may be utilized in the preparation of the novel alkyds, depending upon whether they are cooked with the alkyd or merely blended therewith. Such modifiers include the protein plastics, natural resins as rosin, synthetic resins as the nitro-cellulose, phenol-formaldehyde, urea-formaldehyde, and melamine-type resins, synthetic resins obtained by the addition polymerization of unsaturated compounds, such as styrene, alpha-methylstyrene, vinyl chloride, vinylidene chloride, vinyl acetate, methyl acrylate, methyl methacrylate, and the like, as well as mixtures thereof; particular effects can be obtained by one skilled in the art without undue experimentation which will determine the precise amount of modifier desirable.

In general, the polybasic acid or acids, polyol, and fatty acid are interreacted in proportions sufficient to provide about a 5 to 25 weight percent excess of polyol. Excess polyol may be defined as that amount of polyol in excess of the amount necessary to combine with the sum of the acid groups in the fatty acid and the polybasic acid on a theoretical basis. Oil-modified alkyd resins are conventionally characterized as short oil alkyd resins, medium oil alkyd resins, and long oil alkyd resins, depending upon the ratio of fatty acid to the dibasic acid in the preparation of the resin. Long oil alkyd resins are normally prepared by the interreaction of about 3.1 to about 3.4 equivalents of polyol with about 2 equivalents of polycarboxylic acid and 1 equivalent of unsaturated fatty acid. Progressively larger amounts of polycarboxylic acid and progressively smaller amounts of unsaturated fatty acid are utilized to provide for a shorter oil length. Thus, short oil alkyd resins may be prepared by the interreaction of about 3.1 to about 3.4 equivalents of polyol with about 2.3 to about 2.5 equivalents of polycarboxylic acid and from about 0.7 to about 0.5 equivalent of unsaturated fatty acid. An approximate classification on a weight basis is as follows:

|                    | Percent              |                      |
|--------------------|----------------------|----------------------|
|                    | Phthalic anhydride   | Fatty acid or oil    |
| Short oil length   | 40–50                | 30–40                |
| Medium oil length  | 30–40                | 40–50                |
| Long oil length    | 20–30                | >55                  |

Those skilled in the art will recognize that replacement of unsaturated fatty acid with a dibasic acid increases the functionality of the resin so that it is extremely difficult to get a low acid value without gelation. It is therefore necessary in some circumstances to add some monobasic acid such as benzoic acid, para-tertiary butyl benzoic, or saturated oil acid, to the modifier acid or oil to a balance of 100 mol percent of the modifier. Generally, these additional acids are present in amounts ranging from 0.0 to 70 mol percent. Alternatively, one may increase the amount of excess polyol. The equivalents in the instant paragraph are set forth on the basis of maximum equivalents of polyol and minimum equivalents of acid. It will be apparent that higher amounts of acid would tend to result in a higher acid value.

SUMMARY OF THE INVENTION

It has been discovered that relatively small quantities of an aromatic primary amino monocarboxylic acid, or compounds which disproportionate to said acids, are extremely effective in providing rapid tack-free drying of short oil and medium oil alkyd resins without sacrificing hardness, flexibility, or chemical resistance.

PREFERRED EMBODIMENT OF THE INVENTION

The preferred oil-modified alkyd resin composition of the instant invention may be defined as intercondensation products of about 3.2 to about 5.4 equivalents of a polyol containing from about 2.5 to 4.5 hydroxyl groups per molecule with about 2.2 to 3.4 equivalents of a polycarboxylic acid and about 1 to about 0.55 equivalent of an oil modifier consisting of about 30 to about 100 mol percent of an unsaturated drying oil or drying oil fatty acid, any balance being a monobasic carboxylic acid, such as benzoic acid. Additionally, the resin composition has combined therein from about 3 to about 15% by weight of an aromatic primary amino monocarboxylic acid or a precursor compound which would give rise thereto. Thus, improved rapid drying short to medium oil-modified alkyd resins are provided in accordance with the present invention.

The preferred polycarboxylic acid to be used in producing the novel alkyds is phthalic anhydride. Isophthalic and terephthalic acids may not be substituted in substantial part or in toto for phthalic acid, although minor amounts less than 10% based on the phthalic acid may be tolerated. The amount of phthalic anhydride used is in the range from about 25 to about 50% by weight of the modified alkyd resin, depending on the particular oil length desired. Up to about 1/10 of the phthalic anhydride may be replaced with another dibasic acid, e.g. maleic acid or anhydride, fumaric acid, itaconic acid or anhydride, isophthalic or terephthalic acid, adipic, sebacic, azelaic acids, etc.

Preferred polyhydric alcohols to be used in the preparation of the alkyds are the aliphatic alcohols possessing from 3 to 6 hydroxyl groups and containing from 3 to 14 carbon atoms, such as glycerol, pentaerythritol, mannitol, sorbitol, 1,4,6-octanetriol, and 1,3,5-hexanetriol. The polyhydric alcohol component should contain an average of from about 2.5 to about 4.5 hydroxyl groups per molecule and, preferably, about 3 hydroxyl groups per molecule; most preferred are trimethylol ethane and trimethylol propane.

The preferred modifiers comprise the drying oil fatty acids and their mono-, di-, and triglycerides. Particularly preferred modifiers are the drying oil fatty acids containing from 18 to 24 carbon atoms, although shorter chain acids down to $C_{12}$ may be present as impurities. Generally, the useful acids are derived from oils having an iodine number of 110 to 195.

The preferred aromatic aminomonocarboxylic acids are the o-, m-, or p-amino benzoic acids, particularly anthranilic acid (o-amino benzoic acid).

A preferred compound which is believed to yield anthranilic acid during the reaction is isatoic anhydride. In general, replacement of anthranilic acid with isatoic anhydride may be made on a mol-per-mol basis, but it will be found that, generally, the alkyds formed from the isatoic anhydride are more functional than the corresponding anthranilic acid alkyds. This may be accommodated by using a smaller amount of functional ingredients, or by substituting some benzoic acid or p-t-butyl benzoic acid for phthalic anhydride, or trimethylol ethane for pentaerythritol in order to obtain the same acid value. This might be explained on the basis that the isatoic anhydride does not convert completely to anthranilic acid and therefore has greater functionality. When the isatoic anhydride is added to an alkyd at 320° to 340° F., the decarboxylation is evidenced by considerable foaming. The film properties using either anthranilic acid or isatoic anhydride are found to be very similar.

In the preferred method for preparing the instant fast drying alkyds, any one of three procedures may be utilized. One procedure is the standard procedure of forming an alkyd by first preparing the monoglyceride, followed by addition of the dibasic acid and then the amino benzoic acid. A second method involves the reaction of the amino benzoic acid with a portion of the dibasic acid at about 300° F., followed by the addition of the other alkyd ingredients. This method requires the use of fatty acids or a mixture of fatty acid and oil, since the monoglyceride will not form. The third method involves the use of fatty acids or a mixture of fatty acids and oils, reacting all the ingredients simultaneously in the kettle similar to the standard preparation of a normal alkyd. Examples of preparation by each of these methods will be found in the following examples where all parts are parts by weight unless otherwise denoted.

A plurality of alkyd resins have been prepared in accordance with the following examples utilizing phthalic anhydride, pentaerythritol, fatty acids and, except for the prior art resin (Example 2), an aromatic amino monocarboxylic acid. About a 5% molar excess of polyol is used in order to obtain equivalent degrees of polymerization. All the ingredients are charged at once to a flask fitted with a reflux condenser and water separation trap. The charge is heated to a temperature of about 440° F. over a six-hour period and maintained at this temperature for about six hours to a desired acid value. An atmosphere of refluxing xylene vapor is maintained over the cook and vigorous agitation is employed. Water is azeotropically removed as evolved during the course of the reaction.

At the end of the reaction as determined by acid number, the alkyd resin is diluted while hot with solvents to provide alkyd resin formulations containing about 50 weight percent of resin solids (50% NVM). After cooling, air-dried films with drier added and having a thickness of about 1 mil dry, and baked films having a thickness of about 1 mil are formed from the resin without the use of extraneous driers. The air-dried films are prepared and cured at room temperature; the baked films are cured without drier added at 250° F. for 30 minutes, the films are tested for their physical properties.

The driers used in the subsequent examples were mixed lead and cobalt naphthenates. The amount of such salts used was in each example such as to provide 0.5% lead and 0.06% cobalt calculated as the metal and based on the NVM (nonvolatile matter). In determining drying time, the driers were added as a solution in mineral spirits to the resinous composition and allowed to stand overnight before the draw-downs were made and drying time determined. Tack-free drying times were determined with a Zapon tack tester using a 500-gram weight for 5 seconds.

In each case where anthranilic acid was added in an amount less than about 10% by weight of the resin composition, an improvement in drying rate was observed. Where isatoic anhydride was substituted for anthranilic acid, a similar improvement in drying rate was also observed.

Example 1

1475 parts of soybean oil are heated to 350° F. in a standard alkyd cooking kettle. To the hot mixture, add 414 parts pentaerythritol and 5 parts lead soyate. Heat the mixture with stirring up to 440° F., and hold for the formation of the monoglyceride. Then add 505 parts of trimethylol ethane, 1473 parts phthalic anhydride, 92 parts benzoic acid, and 160 parts anthranilic acid. The kettle is sealed for solvent cooking. To the contents, add 160 parts xylene and heat to 440° F., removing the water and returning the solvent. Hold for acid value and cure. The cooking is carried out preferably under a nitrogen blanket. The finished resin has a viscosity of 13 to 16, an acid value of about 13, a cure of 43, and a color of 12 at 50% NVM. The air drying times of resins prepared in accordance with this formulation show tack-free drying times of from 15 minutes to 45 minutes, variation of this magnitude from batch to batch being experienced from day to day due to external conditions, e.g. humidity.

Example 2

The following quantities of ingredients are charged to a cook for a prior art resin containing no amino benzoic acid:

| | Parts |
|---|---|
| Alkali refined soybean oil | 1456 |
| Pentaerythritol | 725 |
| Trimethylolethane | 156 |
| Phthalic anhydride | 1259 |
| Benzoic acid | 539 |
| Lead alcoholysis catalyst (lead ricinoleate) | 2 |
| Base input | 4137 |
| Base output | 3688 |
| Xylene | 2951 |
| V.M.+P. naphtha | 737 |

Agitation is provided under an inert gas blanket, while soybean oil is heated to 350° F. Part of the pentaerythritol (483 parts) and lead alcoholysis catalyst are added and heated to 440° F. and then held for monoglyceride formation. The phthalic anhydride, benzoic acid, remaining pentaerythritol (242 parts), and the trimethylolethane are then added, and the mixture is heated to 380° F. and held for 1½ hours, after which it is heated to 470° F. and held for another hour. The mixture is blown lightly with inert gas and held for acid value, cure and viscosity, then cooled and reduced with xylene and V.M.+P. naphtha, and then filtered. The drying time for the above resin is 3 hours with naphthenate driers added. It would not air dry in this time without the naphthenate driers.

FINAL CHARACTERISTICS OF THE RESIN

| | |
|---|---|
| Body, Gardner-Holdt _____stokes__ | 10–13 |
| Acid value | 9.1 |
| Cure, 200° C. _____sec__ | 16 |
| Percent NVM after reduction | 50 |

Example 3

The following quantities of ingredients are charged to a cooking kettle:

| | Parts |
|---|---|
| Alkali refined soybean oil | 1475 |
| Phthalic anhydride | 1500 |
| Pentaerythritol | 414 |
| Trimethylolethane | 505 |
| Anthranilic acid | 160 |
| Benzoic acid | 92 |
| Lithium ricinoleate | 4 |
| Base input | 4150 |
| Base output | 3790 |
| Xylene | 3032 |
| V.M.+P. naphtha | 758 |

Agitation is provided under an inert gas blanket, while soybean oil is heated to 400° F. The pentaerythritol and lithium ricinoleate are added and heated to 440° F., and then held for monoglyceride formation. The phthalic anhydride, trimethylolethane, benzoic acid, and anthranilic acid are then added and heated to 440° F., and held for one hour. The mixture is blown with inert gas and held for acid value, cure, and viscosity, then cooled and reduced with xylene and V.M.+P. naphtha, and then filtered. The tack-free drying time for the above reduced resin is 98 minutes with driers added.

FINAL CHARACTERISTICS OF THE RESIN

| | |
|---|---|
| Body, Gardner-Holdt _____stokes__ | 16–20 |
| Acid value | 10.2 |
| Cure, 200° C. _____sec__ | 41 |
| Percent NVM after reduction | 50 |

Example 4

The following quantities of ingredients are charged to a cooking kettle:

| | Parts |
|---|---|
| Alkali refined oil | 1455 |
| Phthalic anhydride | 1555 |
| Pentaerythritol | 374 |
| Trimethylolethane | 558 |
| Anthranilic acid | 160 |
| Lithium ricinoleate | 4 |
| Base input | 4106 |
| Base yield | 3740 |
| Xylene | 3650 |
| V.M.—P. naphtha | 910 |

Agitation is provided under an inert gas blanket, while soybean oil is heated to 350° F. The pentaerythritol and lithium ricinoleate are added and heated to 440° F., and then held for monoglyceride formation. The trimethylolethane, phthalic anhydride, and anthranilic acid are then added and heated to 440° F. and held for one hour. The inert gas blow is then begun and the mixture held for acid value, cure, and viscosity, after which it is cooled and reduced with xylene and V.M.+P. naphtha and then filtered. Drying time for the above resin ranges from 15 minutes to 45 minutes with driers added. Variation in drying time from batch to batch is experienced due in part at least to daily variations in drying conditions. One batch produced in accordance with this example showed a tack-free air drying time of 39 minutes. A similarly formulated and processed resin substituting m-amino benzoic acid for anthranilic acid on a gram-for-gram basis showed a tack-free drying time of 35 minutes when tested at the same time.

FINAL CHARACTERISTICS OF THE RESIN

| | |
|---|---|
| Body, Gardner-Holdt _____stokes__ | 13–16 |
| Acid value | 12.3 |
| Cure, 200° C. _____sec__ | 11 |
| Percent NVM after reduction | 45 |

Example 5

The following quantities of ingredients are charged to a cooking kettle:

| | Parts |
|---|---|
| Alkali refined soybean oil | 1475 |
| Phthalic anhydride | 1500 |
| Pentaerythritol | 414 |
| Trimethylolethane | 505 |
| Isatoic anhydride | 190 |
| Benzoic acid | 92 |
| Lithium ricinoleate | 4 |
| Base input | 4180 |
| Base output | 3810 |
| Xylene | 3048 |
| V.M.+P. naphtha | 762 |

Agitation is provided under an inert gas blanket, while soybean oil is heated to 400° F. The pentaerythritol and lithium ricinoleate are added and the mixture heated to 440° F., and then held for monoglyceride formation. The phthalic anhydride, trimethylolethane, benzoic acid, and isatoic anhydride are then added and heated to 440° F. and held for one hour. The mixture is then blown with inert gas and held for acid value, cure, and viscosity, after which it is cooled and reduced with xylene and V.M.+P. naphtha, and then filtered. The tack-free drying time for the above reduced resin is 109 minutes with driers added.

FINAL CHARACTERISTICS OF THE RESIN

| | | |
|---|---|---|
| Body, Gardner-Holdt | stokes | 20 |
| Acid value | | 10.4 |
| Cure, 200° C. | sec | 36 |
| Percent NVM after reduction | | 50 |

Example 6

The following quantities of ingredients are charged to a cooking kettle:

| | Parts |
|---|---|
| Tall oil fatty acids | 813 |
| Alkali refined soybean oil | 715 |
| Phthalic anhydride | 1500 |
| Pentaerythritol | 414 |
| Trimethylolethane | 619 |
| Anthranilic acid | 160 |
| Benzoic acid | 92 |
| Base input | 4313 |
| Base output | 3905 |
| Xylene | 3124 |
| V.M.+P. naphtha | 781 |

Agitation is provided under an inert gas blanket, while 800 parts phthalic anhydride and anthranilic acid are heated to 300° F. and held for one hour. The tall oil fatty acids and soybean oil are then added and reheated to 300° F., after which the pentaerythritol and 700 remaining parts of phthalic anhydride are added and the mixture reheated to 300° F. The trimethylolethane and benzoic acid are then added, and the mixture is heated slowly to 440° F. and held for one hour. The mixture is then blown lightly with inert gas and held for acid value, cure, and viscosity, then cooled and reduced with xylene and V.M.+P. naphtha, and then filtered. The tack-free drying time for the above reduced resin is 55 minutes with driers added.

FINAL CHARACTERISTICS OF THE RESIN

| | | |
|---|---|---|
| Body, Gardner-Holdt | stokes | 10 |
| Acid value | | 9.3 |
| Cure, 200° C. | sec | 50 |
| Percent NVM after reduction | | 50 |

Example 7

This example is like Example 6 but illustrates a different cooking procedure. The following quantities of ingredients are charged to a cooking kettle:

| | Parts |
|---|---|
| Tall oil fatty acids | 813 |
| Alkali refined soybean oil | 715 |
| Phthalic anhydride | 1500 |
| Pentaerythritol | 414 |
| Trimethylolethane | 619 |
| Anthranilic acid | 160 |
| Benzoic acid | 92 |
| Base input | 4313 |
| Base output | 3910 |
| Xylene | 3128 |
| V.M.—P. naphtha | 782 |

Agitation is provided under an inert gas blanket, while the tall oil fatty acids and soybean oil are heated to 350° F. The pentaerythritol and phthalic anhydride are then added and heated to 300° F., after which the trimethylolethane is added and the mixture reheated to 300° F. The benzoic acid and anthranilic acid are then added and the mixture heated slowly to 440° F. and held for one hour. The mixture is blown with inert gas and held for acid value, cure, and viscosity, then cooled and reduced with xylene and V.M.+P. naphtha and filtered. The tack-free drying time for the above reduced resin is 45 minutes with driers added.

FINAL CHARACTERISTICS OF THE RESIN

| | | |
|---|---|---|
| Body, Gardner-Holdt | stokes | 13 |
| Acid value | | 11.6 |
| Cure, 200° C. | sec | 35 |
| Percent NVM after reduction | | 50 |

What is claimed is:

1. An alkyd resin composition comprising the intercondensation product of about 3.2 to about 5.4 equivalents of a polyol material containing an average of from about 2.5 to 4.5 hydroxyl groups per molecule with from about 2.2 to 3.4 equivalents of phthalic acid anhydride and, correspondingly,
   (a) from about 1 to about 0.55 equivalent of a modifier component consisting of about 30 to about 100 mol percent of an unsaturated vegetable or marine drying oil or fatty acid thereof, balance a monobasic carboxylic acid, and, additionally,
   (b) from about 3 to about 15% by weight of the resin composition of a fast-drying agent selected from anthranilic acid and isatoic acid.

2. An alkyd resin coating composition as in claim 1, wherein said polyol is pentaerythritol, said unsaturated oil is soybean oil.

3. An alkyd resin coating composition as in claim 1, wherein the oil length of the modified alkyd is from about 30 to about 50%.

4. An alkyd resin composition in accordance with claim 1 in which a portion of the phthalic acid anhydride not to exceed 10% by weight thereof has been replaced with a dibasic acid selected from the group consisting of maleic acid or its anhydride, itaconic acid or its anhydride, isophthalic acid or its anhydride, terephthalic acid or its anhydride, adipic acid or its anhydride, sebacic acid or its anhydride, azelaic acid or its anhydride.

5. In an alkyd resin composition comprising the intercondensation product of about 3.2 to about 5.4 equivalents of a polyol containing an average of from about 2.5 to 4.5 hydroxyl groups per molecule with from about 2.2 to 3.4 equivalents of phthalic anhydride and, correspondingly, from about 1 to about 0.55 equivalent of a modifier component consisting of about 30 to about 100 mol percent of an unsaturated vegetable or marine drying oil or fatty acid thereof, any balance being a monocarboxylic aromatic acid, the improvement consisting of the inclusion of from about 3 to about 15% by weight of the resin composition of anthranilic acid.

6. In an alkyd resin composition comprising the intercondensation product of about 3.2 to about 5.4 equivalents of a polyol containing an average of from about 2.5 to 4.5 hydroxyl groups per molecule, with from about 25 to about 50% by weight of phthalic acid anhydride having from about 50 to 30% by weight unsaturated vegetable or marine drying oil or fatty acid thereof, the improvement consisting of the addition of from about 3 to about 15% by weight of the resin composition of anthranilic acid.

7. An alkyd resin composition comprising the intercondensation product of
   (a) from 3.2 to 5.4 equivalents of a mixed polyol material of pentaerythritol and trimethylolethane in a 1:1.4 mol ratio, respectively, with
   (b) from 2.2 to 3.4 equivalents of phthalic anhydride, and
   (c) from about 0.55 to about 1 equivalent of a mixture of
      (1) alkali refined soybean oil, and
      (2) benzoic acid, the amount of benzoic acid being about 6.2% by weight of the soybean oil, and additionally
   (d) about 4% by weight of components (a), (b), and (c) of anthranilic acid.

8. A process for forming an alkyd resin composition, comprising heating from about 1 to about 0.55 equivalents of a modifier component consisting of about 30 to about 100 mol percent of an unsaturated vegetable or marine drying oil or fatty acid thereof, any balance being a monocarboxylic aromatic acid, to a temperature in the range of from about 300° F. to 500° F., adding thereto from about 3.2 to about 5.4 equivalents of a polyol containing an average of from about 2.5 to 4.5 hydroxy groups per molecule, heating to a temperature in the range from about 400° to 500° F. until an acid number of from 9.1 to 13 is achieved, thereafter adding from about 2.2 to 3.4 equivalents of phthalic anhydride, heating the mixture at a temperature less than 500° F. and thereafter adding from about 3 to about 15% by weight of the resin composition of a fast-drying agent selected from anthranilic acid and isatoic acid, and cooking the contents in a closed kettle under an inert gas blanket until an acid value of about 10 is obtained, and recovering said alkyd resin composition.

References Cited

UNITED STATES PATENTS

| | | | |
|---|---|---|---|
| 2,973,331 | 2/1961 | Kraft | 260—22 |
| 2,957,837 | 10/1960 | Smith et al. | 260—22 |
| 2,967,840 | 1/1961 | Phillips et al. | 260—22 |

FOREIGN PATENTS

| | | | |
|---|---|---|---|
| 582,164 | 9/1933 | Germany | 260—76 |
| 1,065,306 | 9/1960 | Germany | 260—76 |
| 1,075,476 | 11/1960 | Germany | 260—76 |

OTHER REFERENCES

Chatfield: Varnish Constituents, Leonard Hill Limited, London, 1953, pp. 266–273.

Chemical Abstracts, Volume 55, No. 14, July 10, 1961, p. 13873.

Chemical Abstracts, volume 61, No. 6, Sept. 14, 1964, p. 6834e.

Chemical Abstracts, volume 71, No. 4, July 28, 1969, p. 13824n.

DONALD E. CZAJA, Primary Examiner

R. W. GRIFFIN, Assistant Examiner

U.S. Cl. X.R.

117—161 K; 260—32.6 R